June 25, 1957 R. A. WHITLOCK, JR 2,796,886
PILOT CONTROLLED FLUID PRESSURE OPERATED DIAPHRAGM VALVE
Filed July 30, 1952 2 Sheets-Sheet 2
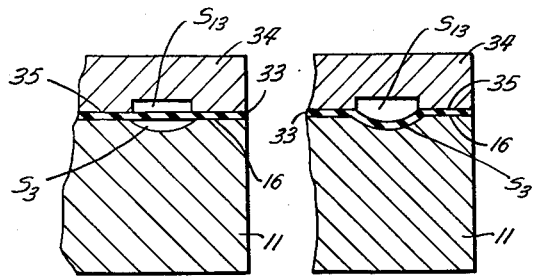
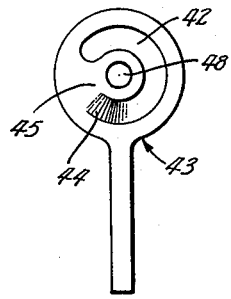
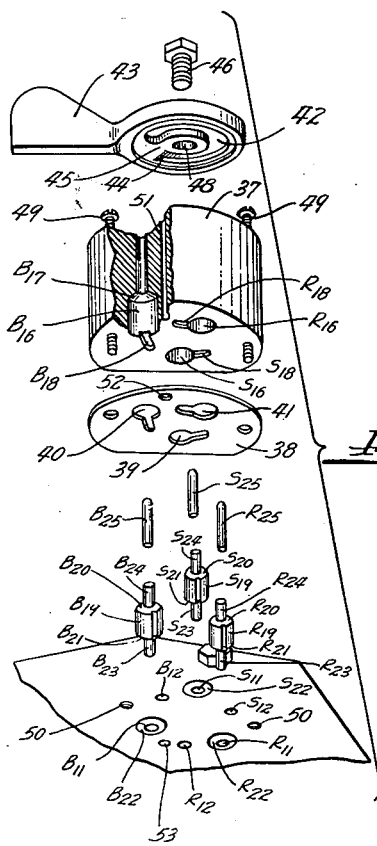
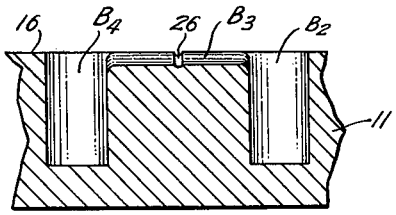
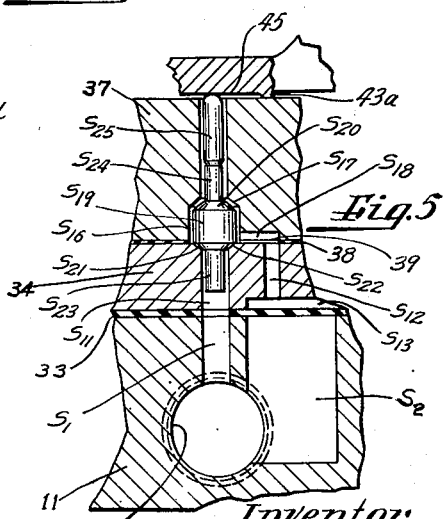
Inventor
Robert A. Whitlock, Jr.
By McCanna and Morsbach
Attys.

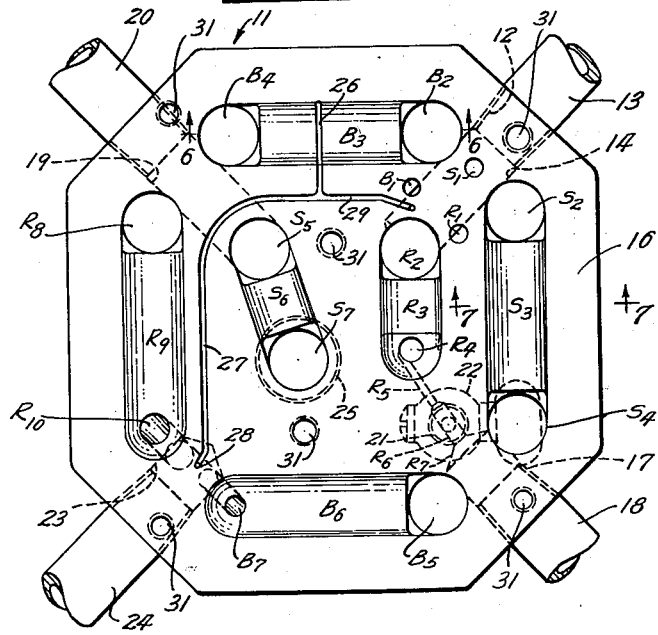

United States Patent Office 2,796,886
Patented June 25, 1957

2,796,886

PILOT CONTROLLED FLUID PRESSURE OPERATED DIAPHRAGM VALVE

Robert A. Whitlock, Jr., Rockford, Ill., assignor to Aquamatic Inc., a corporation of Illinois Application July 30, 1952, Serial No. 301,685

12 Claims. (Cl. 137—604)

This invention relates to a multiple port valve, and particularly to such a valve adapted to control water treatment apparatus.

It is an object of this invention to provide a diaphragm-type valve of novel construction which serves to minimize the likelihood of leakage.

It is also an object of this invention to provide a novel multiple port control valve for water treatment apparatus, such as a water softener.

Another object of this invention is to provide a novel multiple port control valve for water treatment apparatus which has a novel and simplified arrangement for preventing leakage through the valve from the untreated water inlet to the treated water outlet.

A further object of this invention is to provide a novel pilot-valve-operated diaphragm-type valve which is particularly adapted for controlling water treatment apparatus, such as a water softener tank.

Other and further objects and advantages of the invention will be apparent from the following description of a preferred embodiment thereof, which is shown in the accompanying drawings to illustrate the principles and mode of operation of the invention.

In the drawings:

Figure 1 is a front view of the back plate of the valve, viewed from the inner side of the back plate;

Figure 2 is a similar view of the front plate of the valve, also viewed from the inner side, and the pilot valve mounted on the outer side of the front plate;

Figure 3 is a perspective view of the assembled valve of the present invention;

Figure 4 is an exploded perspective view of the pilot valve controlling the flows through the main portion of the valve shown in Figs. 1–3;

Figure 5 is a fragmentary section through the Fig. 3 valve assembly, illustrating a portion of the pilot valve and the manner in which it coacts with the main portion of the valve;

Figure 6 is a section through one of the elongated channels formed at the inner face of the back plate, taken along the line 6—6 in Fig. 1;

Figure 7 is a fragmentary section taken transversely across one of the elongated channels in the main portion of the valve, taken along the line 7—7 in Fig. 1, and showing the diaphragm positioned to permit flow across the channel;

Figure 8 is a view similar to Fig. 7 and showing the diaphragm positioned to block flow across the channel;

Figure 9 is a front view, taken from the inner side, of the adjustable operating lever for the Fig. 4 pilot valve.

Back plate

Referring to the drawings, the back plate 11 is formed with a plurality of ports and passages arranged for communication with the various conduits of a water treatment system, in this instance a water softener. As shown in Fig. 1, the passage 12 in the back plate is arranged to receive untreated water from the inlet pipe 13. The passage 12 leads to an internal chamber 14 in the back plate having three outlet passages $S_1$, $B_1$ and $R_1$, the respective flows through these passages being controlled by the pilot valve, indicated generally at 15 (Fig. 3), as described in detail hereinafter.

The back plate is also formed with a passage $S_2$ leading from the chamber 14 to an elongated channel $S_3$ formed at the inner face 16 of the back plate and having an arcuate recessed configuration as shown in Figs. 6 and 7. At the opposite side of the channel $S_3$ there is provided a passage $S_4$ leading to the passage 17 in the back plate which communicates with the pipe 18 leading to the top of the water softener tank.

Another passage $B_2$ communicating with the chamber 14 in the back plate leads to one side of an elongated channel $B_3$ formed in the inner face 16 of the back plate 11 and similar in configuration to the already-described channel $S_3$. At the opposite side of the channel $B_3$ the back plate is formed with a passage $B_4$ leading to a passage 19 which communicates with the pipe 20 connected to the bottom of the water softener tank.

Still another passage $R_2$ communicates with the back plate chamber 14 and leads to one side of an elongated channel $R_3$ formed in the inner face 16 of the back plate. At the other side of the channel $R_3$ there is provided a passage $R_4$ leading to the internal passage $R_5$ in the back plate which forms the nozzle of an ejector. At the outlet of the passage $R_5$ there is formed a passage having a cylindrical inlet portion $R_6$ forming the throat of the ejector and a frusto-conical outwardly expanding portion $R_7$ leading to the passage 17 in the back plate.

A reagent inlet passage 21 is formed in the back plate to communicate with the ejector in the back plate at the passage $R_6$. A reagent feed pipe (not shown) is connected to the outer face of the back plate 11 in communication with the passage 21, a shutoff valve 22 being provided at this connection for shutting off the brine flow into the passage 21 at the desired time. With this arrangement, water flowing through the ejector $R_5$, $R_6$ in the back plate causes reagent to be drawn through the reagent feed pipe and the passage 21 in the back plate and thence through the throat $R_6$ of the ejector to the passage 17 in the back plate.

Communicating with the back plate passage 17 is a passage $B_5$ at one side of the elongated channel $B_6$ formed in the inner face of the back plate. Adjacent the other end of the channel $B_6$ there is formed a flow restricting passage $B_7$ of small diameter leading to the back plate passage 23 which communicates with the drain pipe 24.

Communicating with the passage 19 in the back plate is a passage $R_8$ leading to one side of the elongated channel $R_9$ formed in the inner face of the back plate. Adjacent the other end of the channel $R_9$ there is located a relatively small passage $R_{10}$ communicating with the passage 23 in the back plate.

Also in communication with the back plate passage 19 is a passage $S_5$ located at one side of the elongated channel $S_6$, which at its other side has a passage $S_7$ leading to the service pipe 25.

On the top surface of the channel $B_3$ intermediate its length there is formed a groove or channel 26 which communicates with a surface groove or channel 27 formed in the inner face of the back plate 16 and leading through a passage 28 to the drain passage 23 in the back plate. Another surface groove or channel 29 leads to the groove 27 from a point on the inner face of the back plate 17 between the passages $B_1$ and $R_1$ therein.

A plurality of threaded mounting holes 31 are formed at spaced locations in the back plate 11 for receiving the threaded bolts 32 (Fig. 3) by means of which the back plate 11, diaphragm 33 and the front plate 34 are held in assembled relation.

Front plate

The front plate 34 of the valve (Fig. 2) is mounted to have its inner face 35 facing the inner face 16 of the back plate 11, with the diaphragm 33 snugly received between these inner faces of the front and back plates of the valve. A plurality of holes 36 extend through the front plate for passing the attachment bolts 32.

At its inner face the front plate 34 is formed with a plurality of ports $S_{11}$, $B_{11}$ and $R_{11}$, positioned respectively to register with the passages $S_1$, $B_1$ and $R_1$ in the back plate. The port $S_{11}$ is adapted to communicate through the pilot valve 15 with an internal passage $S_{12}$ in the front plate leading to a channel $S_{13}$ formed in the inner face 35 of the front plate. When the valve is assembled, the channel $S_{13}$ in the front plate overlies the channel $S_3$ in the back plate and the back plate passages $S_2$ and $S_4$ at opposite sides of this channel. A narrow channel $S_{14}$ formed in the inner face of the front plate 34 leads from the channel $S_{13}$ to another channel $S_{15}$. The channel $S_{15}$ is also formed in the inner face 35 of the front plate 34 and, when the valve is assembled, overlies the channel $S_6$ on the back plate 11 and the passages $S_5$ and $S_7$ thereat.

The port $B_{11}$ in the front plate is adapted to communicate through the pilot valve 15 with an internal passage $B_{12}$ in the front plate leading to a channel $B_{13}$ formed in the inner face of the front plate. When the valve is assembled, this channel $B_{13}$ overlies the channel $B_3$ formed at the inner face of the back plate and the passages $B_2$ and $B_4$ at opposite sides of this channel. A narrow channel $B_{14}$ formed in the inner face 35 of the front plate 34 leads from the channel $B_{13}$ to the channel $B_{15}$, which, when the parts of the valve are assembled as shown in Fig. 3, overlies the channel $B_6$ at the inner face of the back plate 11 and the passages $B_5$ and $B_7$ thereat.

The port $R_{11}$ in the front plate 34 is adapted to communicate through the pilot valve 15 with an internal passage $R_{12}$ in the front plate leading to a channel $R_{13}$ formed in the inner face 35 of the front plate and positioned in overlying relation with the channel $R_3$ and the passages $R_2$ and $R_4$ in the back plate 11 when the valve is assembled. A narrow channel $R_{14}$ is formed in the inner face 35 of the front plate 34 and effects communication between the channel $R_{13}$ and another channel $R_{15}$ formed in the inner face of the front plate. The channel $R_{15}$ overlies the channel $R_9$ and the passages $R_8$ and $R_{10}$ in the back plate 11 when the valve is assembled.

Diaphragm

The diaphragm 33 is a relatively thin sheet of flexible resilient material clamped snugly between the respective inner faces 16 and 35 of the back plate 11 and the front plate 34. The diaphragm 33 is imperforate except at the attachment bolts 32 and the back plate passages $S_1$, $B_1$ and $R_1$ and the aligned front plate passages $S_{11}$, $B_{11}$ and $R_{11}$. The diaphragm is thus mounted to be responsive to the fluid pressure in each of the channels in the inner face 35 of the front plate 34 to be moved from the Fig. 7 position, permitting flow across the respective channel at the inner face of the back plate 11, to the Fig. 8 position, blocking flow across the respective channel.

Pilot valve

The pilot valve assembly, indicated generally at 15 in Fig. 3, is mounted on the outer face of the front plate 34 above the passages $S_{11}$, $B_{11}$ and $R_{11}$ therein. This pilot valve is arranged to selectively control the flows to and from the channels in the inner face of the front plate to thereby control the position of the diaphragm for controlling the flows across the respective channels at the inner face of the back plate.

Referring to Fig. 4, the pilot valve 15 includes a valve body 37 having three axially extending passages $S_{16}$, $B_{16}$ and $R_{16}$ positioned to register with the passages $S_{11}$, $B_{11}$ and $R_{11}$ at the outer face of the front plate 34 of the valve. As shown in Figs. 4 and 5, each of these passages in the pilot valve body 37 includes a frusto-conical valve seat $S_{17}$ (Fig. 5), $B_{17}$ (Fig. 4) and $R_{17}$ (not shown) between the narrow outer portion of the passage and the enlarged inner portion of the passage adjacent the front plate 34. At the inner end of the pilot valve body 37 (adjacent the outer face of the front plate 34) there are formed three channels $S_{18}$, $B_{18}$ and $R_{18}$ leading respectively from the pilot valve body passages $S_{16}$, $B_{16}$ and $R_{16}$ and at their opposite ends positioned to overlie the passages $S_{12}$, $B_{12}$ and $R_{12}$, respectively, in the front plate 34. A gasket 38 is located between the inner end of the pilot valve body 37 and the outer face of the front plate 34 and is formed with key-hole shaped apertures 39, 40 and 41 which are identical in configuration with the passages at the inner end of the valve body. By virtue of this construction, it will be seen that the pilot valve body passages $S_{16}$, $B_{16}$ and $R_{16}$ and $S_{18}$, $B_{18}$ and $R_{18}$ effect communication between the passages $S_{11}$, $B_{11}$ and $R_{11}$ in front plate 34 and the passages $S_{12}$, $B_{12}$ and $R_{12}$ therein leading to the channels at the inner face of the front plate.

For controlling the communication between these passages in the front plate there are provided three reciprocatory valves $S_{19}$, $B_{19}$ and $R_{19}$ having enlarged middle portions shaped to be loosely received in the enlarged inner ends of the respective pilot valve body passages $S_{16}$, $B_{16}$ and $R_{16}$. At their outer ends these enlarged portions of the valves terminates in frusto-conical portions $S_{20}$, $B_{20}$ and $R_{20}$ shaped to seat against the frusto-conical valve seats $S_{17}$, $B_{17}$ and $R_{17}$ at the pilot valve body passages $S_{16}$, $B_{16}$ and $R_{16}$. At the lower ends of the enlarged portions of the reciprocatory valves $S_{19}$, $B_{19}$ and $R_{19}$ there are provided similar frusto-conical portions $S_{21}$, $B_{21}$ and $R_{21}$ shaped to seat on frusto-conical valve seats $S_{22}$, $B_{22}$ and $R_{22}$ formed at the outer ends of the passages $S_{11}$, $R_{11}$ and $B_{11}$ in the front plate 34. The length of the respective enlarged portions of the reciprocatory valves $S_{19}$, $B_{19}$ and $R_{19}$ is less than the spacing between the respective pairs of spaced valve seats $S_{17}$ and $S_{22}$ (Fig. 5), $B_{17}$ and $B_{22}$, and $R_{17}$ and $R_{22}$, so that each of these valve members can seat against only one of these valve seats at a time. Inner and outer stems $S_{23}$ and $S_{24}$, $B_{23}$ and $B_{24}$, and $R_{23}$ and $R_{24}$ project from the opposite ends of the enlarged portions of the valve members respectively into the front plate passages $S_{11}$, $B_{11}$ and $R_{11}$ and the narrow outer portions of the passages $S_{16}$, $B_{16}$ and $R_{16}$ in the pilot valve body. These stems are dimensioned to be received loosely in these passages and to permit flow through these passages around the stems.

Abutting against the outer ends of the stems $S_{24}$, $B_{24}$ and $R_{24}$ there are provided the pins $S_{25}$, $B_{25}$ and $R_{25}$, which are also dimensioned to be loosely received within the narrow upper portions of pilot valve passages $S_{16}$, $B_{16}$ and $R_{16}$ for permitting fluid flow out through these passages. At their outer ends, these pins engage the recessed cam groove 42 formed at the inner face of the rotary operating lever 43 for the pilot valve 15. At one portion the cam groove merges into an inclined portion 44 leading to a high point 45 recessed above the outer marginal portion of the inner face 43a of the lever 43 (Fig. 5). The lever 43 is mounted for turning movement about the outer end of the pilot valve body 37 by means of a screw 46 which passes loosely through a central hole 48 in the lever 43 and which is threadedly received in the outer end of the pilot valve body 37.

In the operation of the pilot valve, at one angular position of the control lever 43 the high point 45 on its inner face engages the outer end of the pin $S_{25}$ and pushes this pin inwardly to force the valve $S_{19}$ against the frusto-conical seat $S_{22}$ at the outer end of the passage $S_{11}$ in the front plate (Fig. 5). This blocks communication between the front plate passages $S_{11}$ and $S_{12}$. At this time, the groove 42 in the lever 43 overlies the pins $B_{25}$ and $R_{25}$ and permits these pins and the valves $B_{19}$ and $R_{19}$ to assume their outermost positions in response to fluid pressure at the front plate passages $B_{11}$ and $R_{11}$, with the valves $B_{19}$ and $R_{19}$ seated against their outer frusto-conical seats $B_{17}$ and $R_{17}$ and permitting communication to be effected between the front plate passages $B_{11}$ and $B_{12}$, and $R_{11}$ and $R_{12}$, through the pilot valve passages $B_{18}$ and $R_{18}$.

Likewise, in the other two operating positions of the lever 43, either the pin $B_{25}$ or the pin $R_{25}$ is depressed to force the corresponding valve against its inner seat, while the other two valves are free to assume their outermost positions for passing water to the corresponding channels at the inner face 35 of the front plate 34.

Screws 49 pass through the pilot valve body 37 and the gasket 38 and are threadedly received at holes 50 at the outer face of the front plate 34 for fixedly mounting the stationary pilot valve body 37 on the front plate.

A passage 51 extends through the pilot valve body 37 with its outer end in communication with the groove 42 in the lever 43 in each of the three operating positions of the lever. At its inner end the passage 51 communicates with a hole 52 in the gasket 38 which registers with a passage 53 extending through the front plate 34. This latter passage communicates through a registering hole in the diaphragm 33 with the surface groove or channel 29 formed in the inner face 16 of the back plate 11 and leading through channel 27 to the drain outlet 23 in the back plate. These passages provide for relief of fluid pressure from the front plate side of the diaphragm when the pilot valve is operative to permit flow across the corresponding channels in the back plate, as described in detail hereinafter.

Operation

In the operation of the above-described valve, it is assumed that initially this valve is arranged for the service run of the water softener. At this time the lever 43 of the pilot valve is positioned to have the high point 45 of the cam surface at its inner face engaging the outer end of the pin $S_{25}$ (Fig. 5). The pin $S_{25}$ depresses the valve $S_{19}$ to force the latter against its inner seat $S_{22}$ to shut off communication between the passages $S_{11}$ and $S_{12}$ in the front plate 34. Any fluid pressure at the channels $S_{13}$ and $S_{15}$ at the inner face 35 of the front plate is relieved to drain through the front plate passage $S_{12}$, the gasket aperture 39, the passage $S_{18}$ at the inner end of the pilot valve body 37, the pilot valve body passage $S_{16}$ around the valve $S_{19}$, stem $S_{24}$ and pin $S_{25}$ (Fig. 5), beneath the inner face of the lever 43 into the groove 42 therein and thence through the valve body passage 51, gasket hole 52, front plate passage 53, the grooves 29 and 27 in the inner face of the back plate and back plate passages 28 and 23 to the drain pipe 24. Untreated water from the inlet pipe 13 passes into the chamber 14 in the back plate, through the back plate passage $S_2$, across the channel $S_3$, through the back plate passage $S_4$ at the opposite side of the channel and thence through the back plate passage 17 to the pipe 18 leading to the top of the water softener tank. The water passes downward through the water softener tank and is softened therein in the conventional way, the treated water passing from the bottom of the tank through pipe 20 into the passage 19 in the back plate of the control valve. From this passage, the treated water flows through the back plate passage $S_5$, across the channel $S_6$ and through the passage $S_7$ at the other side of this channel to the service outlet 25. It is to be understood that the water is permitted to flow across the channels $S_3$ and $S_6$ because there is no opposing water at line pressure at the channels $S_{13}$ and $S_{15}$ in the front plate which overlie these channels since the valve $S_{19}$ is positioned to block the flow of water from the inlet passage 14 in the back plate to these channels. At the channel $S_3$, the diaphragm 33 is positioned as shown in Fig. 7, with the water pressure at the back plate side of the diaphragm maintaining the diaphragm spaced away from the channel $S_3$ to permit flow across the channel.

At this time, during the service position of the pilot valve, the valve operator pins $B_{25}$ and $R_{25}$ have their respective outer ends registering with the cut-away groove 42 in the inner cam face of the operating lever 43. Thus, the valves $B_{19}$ and $R_{19}$ are free to assume their outermost positions seated against their respective outer valve seats $B_{17}$ and $R_{17}$ under the outward pressure of the water at the inlet passage 14 in the back plate 11. Thus water from the inlet passage 14 is free to flow through the back plate passage $R_1$, the front plate passage $R_{11}$, past the inner valve seat $R_{22}$ around the valve $B_{19}$, through the channel $R_{18}$ at the inner end of the pilot valve body, through the gasket aperture 39, the front plate passage $R_{12}$ and hence to the channels $R_{13}$ and $R_{15}$ at the inner face of the front plate at one side of the diaphragm 33. Since the fluid path through these interconnected channels $R_{13}$ and $R_{15}$ terminates at the channel $R_{15}$, it will be evident that the water pressure at this side of the diaphragm is continually maintained at line pressure in this setting of the pilot valve. At the channel $R_3$ there is a continuing incremental pressure drop along the length of the channel due to friction, etc., this pressure drop accounting for the flow of water in one direction across the channel. Thus, at the discharge end of this channel, adjacent the passage $R_4$, there is a significant fluid pressure unbalance on opposite sides of the diaphragm 33, with the pressure at the front plate side of the diaphragm (at channel $R_{13}$) being at full line pressure and the pressure at the back plate side of the diaphragm (at the channel $R_3$) being at less than full line pressure. This fluid pressure unbalance causes the diaphragm 33 to seat snugly against the channel $R_3$ to shut off the flow thereacross. This seating of the diaphragm is believed to occur progressively from the end of the channel adjacent the passage $R_4$ to the opposite end when line pressure is established at the channel $R_{13}$ in the front plate, since the pressure unbalance is greatest at the end of the channel $R_3$ adjacent the passage $R_4$ and decreases toward the other end of this channel. This substantial fluid pressure unbalance at opposite sides of the diaphragm, due to the elongated construction of the channel, enables the maintaining of a positive seal at the channel without the danger of leakage across the chamber, which is not uncommon in conventional diaphragm-type valves having a short channel. In like manner, at the channel $R_9$ there is a substantial fluid pressure unbalance on opposite sides of the diaphragm 33 since there is line pressure at the front plate channel $R_{15}$ at one side of the diaphragm while the pressure at the back plate side of the diaphragm, at the channel $R_9$, is less than line pressure. In addition to the pressure drop across the channel itself, the fluid pressure at the inlet side of this channel, at the passage $R_8$, is lower than line pressure due to the pressure drop through the water softening system, so that there is fluid pressure unbalance along the entire length of this channel.

At the channel $B_3$, due to the groove 26 which communicates with the drain pipe 24, there is a very substantial pressure unbalance on opposite sides of the diaphragm 33 which causes the diaphragm to seat on the channel $B_3$ and block any flow thereacross. Likewise, at the channel $B_6$, the fluid pressure unbalance on opposite sides of the diaphragm causes the diaphragm to seat against the channel because of the line pressure at the channel $B_{15}$ at the inner face 35 of the front plate 34.

When the exchange material in the water softener tank requires regeneration, the regeneration cycle is initiated by turning the pilot valve operating lever 43 to position the high point 45 on its cam surface engaging the outer end of the pin $B_{25}$. The valve $B_{19}$ is thereby forced to its innermost position seated against its inner seat $B_{22}$ to disconnect the channels $B_{13}$ and $B_{15}$ in the inner face 35 of the front plate 34 from the untreated water inlet chamber 14 and to permit the water in these passages to be exhausted to drain through the pilot valve 15 to the drain groove 29 in the inner face 16 of the back plate 11. Untreated water from the inlet pipe 13 passes into the back plate chamber 14 through the back plate passage $B_2$, across the channel $B_3$, through the back plate passage $B_4$ at the other end of the channel, into the passage 19 in the back plate and thence through the pipe 20 to the bottom of the water softener tank. After backwashing vigorously up through the tank the effluent leaves from the top of the tank and flows through the pipe 18 into the passage 17 in the back plate 11 of the control valve. From here the effluent passes through the back plate passage $B_5$, across the channel $B_6$, through the flow restricting passage $B_7$ into the back plate passage 23 leading to the drain pipe 24. These flows across the channels $B_3$ and $B_6$ occur because of the exhausting of fluid pressure from the opposite side of the diaphragm 33 (at the channels $B_{13}$ and $B_{15}$ in the inner face of the front plate).

During this backwash step of the regeneration cycle, the pilot valve pins $S_{25}$ and $R_{25}$ register with the cut-away groove 42 in the inner cam face of the pilot valve operating lever 43. This enables the valves $S_{19}$ and $R_{19}$ to assume their respective outermost positions under the outward pressure of the water at the inlet chamber 14 in the back plate. The diaphragm 33 seats against the channels $S_3$, $S_6$, $R_3$ and $R_9$ to block the flow of water thereacross due to the fluid pressure unbalances on opposite sides of the diaphragm at these channels.

The next step in the regeneration cycle is the reagent injection step in which brine is drawn into the stream of water flowing to the water softener tank for regenerating the exchange material therein. For this step, the operating lever 43 of the pilot valve is turned to position the high point 45 of its inner cam face in engagement with the outer end of the pin $R_{25}$. This forces the valve $R_{19}$ to its innermost position seated against its inner seat $R_{22}$ to disconnect the front plate channels $R_{13}$ and $R_{15}$ from the inlet chamber 14 in the back plate and to permit the water in these passages to be exhausted to drain through the pilot valve 15 to the drain groove 29 in the inner face 16 of the back plate 11. Water from the inlet pipe 13 passes into the inlet chamber 14 in the back plate and thence through the back plate passage $R_2$, across the channel $R_3$, through the passage $R_4$ at the other side of the channel and through the ejector $R_5$, $R_6$, in the back plate. This flow through the ejector draws brine reagent through the brine inlet 21 into the flowing stream of water and passes the same through the passage 17 to the pipe 18 leading to the top of the water softener tank. The effluent from the bottom of the tank passes through the pipe 20 into the pasage 19 in the back plate 11 of the control valve and thence through the passage $R_8$, across the channel $R_9$, through the passage $R_{10}$ at the opposite side of this channel to the back plate passage 23 leading to the drain pipe 24. The exhausting of fluid pressure from the front plate side of the diaphragm 33 at the channels $R_3$ and $R_9$ permits these flows to occur thereacross in the manner described.

After a sufficient amount of brine has been injected into the softener tank for regenerating the exchange material therein the brine flow into the control valve is stopped by the valve 22 or by any other suitable control means forming no part of the present invention. The water continues to flow through the control valve as during the brine injection step for rinsing the bed of exchange material in the water softener tank and for passing to drain the rinse effluent from the bottom of the softener tank.

During the reagent injection and rinse steps, the groove 42 at the cam face on the operating lever 43 overlies the pilot valve operating pins $S_{25}$ and $B_{25}$, thereby enabling the valves $S_{19}$ and $B_{19}$ to assume their respective outermost positions under the outward pressure of the water at the inlet chamber 14 in the back plate. The diaphragm 33 seats against the channels $S_3$, $S_6$, $B_3$ and $B_6$ to block the flow of water thereacross due to the fluid pressure unbalance on opposite sides of the diaphragm at these channels.

Following the rinse step, the operating lever 43 of the pilot valve 15 is returned to its service position to establish the previously described flows through the control valve during the service run.

During the service run any possible leakage across the channel $B_3$ from the untreated water inlet 14 to the passage 19 leading (across channel $S_6$ during the service run) to the treated water service outlet 20 is positively prevented by the provision of the drain groove 26 in the channel $B_3$. This is particularly advantageous in case the user of the water should create a shock wave in the system, as by turning off a faucet suddenly, which shock wave would tend to lift the diaphragm 33 away from the channel $B_3$ during the service run. Should this occur, such water would flow through the drain grooves 26 and 27 to the lower pressure outlet at the drain pipe 24. Thus, in effect, the drain groove 26 serves the function of a safety valve for preventing leakage of untreated water to the service outlet.

It is to be noted that the described port and passage arrangement in the control valve insure against "blowouts" of the diaphragm at the locations where such are most likely to occure. Such failures in the diaphragm would naturally tend to occur at portions thereon where a substantial area of the diaphragm is unsupported and is therefore exposed to the force of the fluid thereat. These exposed portions of large area on the diaphragm are at the passages $S_2$, $S_4$, $S_5$, $S_7$, $B_2$, $B_4$, $B_5$, $R_2$ and $R_8$ in the back plate. However, at these areas of the diaphragm there is at all times either a fluid pressure balance on opposite sides of the diaphragm, so that the net fluid force on the diaphragm is zero, or only a relatively small pressure unbalance which, though sufficient to insure seating of the diaphragm against the adjacent channel, is not great enough to be apt to cause failure of the diaphragm. The only locations of considerable pressure unbalance on opposite sides of the diaphragm occurs at the passages $R_{10}$ and $B_7$, which lead to drain. However, the restricted size of these passages results in only small areas of the diaphragm being exposed to this great pressure unbalance, so that the net fluid force on the diaphragm is not excessive.

While in the foregoing description and in the accompanying drawings there has been disclosed a specific preferred embodiment of the present invention, it is to be understood that various modifications, omissions and refinements which depart from the described form of the invention may be adopted without departing from the spirit and scope of the present invention. Also, while a particular use to which the invention may be put has been described herein, it is to be understood that the present invention is not limited to this particular use, but may be used wherever a valve having the essential characteristics of the present invention is desired.

I claim:

1. A valve assembly comprising a back plate having a fluid inlet chamber, a plurality of channels formed at the inner face of said back plate, passages leading to and from said channels in the back plate and including inlet passages communicating between said inlet chamber and the channels in the back plate, a front plate formed at its inner face with channels positioned in confronting relation with said channels in the back plate, said front plate also being formed with passages spaced from communication with said channels and communicating with said inlet chamber in the back plate, diaphragm means clamped between the inner faces of the front and back plates and extending across said channels in the back plate to be interposed between the channels at the inner face of the back plate and the channels at the inner face of the front plate, and a pilot valve including a valve body formed with passages which effect communication between said channels and passages in the front plate, valves in said passages in the pilot valve body controlling the communication therethrough between said channels and passages in the front plate, and operating mechanism for said valves for selectively controlling the positions of said valves to block communication between certain of said channels and passages in the front plate and to permit communication between the others of said channels and passages in the front plate for passing to said other channels fluid under pressure from said inlet chamber in the back plate to seat said diaphragm means against the channels in the back plate opposite said other channels in the front plate.

2. The valve of claim 1, wherein each of said channels in the back plate is elongated between the respective passages leading to and from the channel to insure seating of said diaphragm means against the channel in the back plate when fluid under pressure is supplied to the confronting channel in the front plate at the opposite side of said diaphragm means because of fluid pressure unbalance on opposite sides of said diaphragm means away from said inlet passages.

3. The valve of claim 1, wherein there is provided passage means for exhausting through the pilot valve fluid located in the channel in the front plate to which fluid under pressure from the inlet chamber in the back plate is not supplied.

4. A valve assembly comprising a back plate having a fluid inlet chamber, a plurality of elongated channels formed at the inner face of said back plate, passages in the back plate leading to and from the channels therein and including inlet passages communicating between said inlet chamber and the channels in the back plate, a front plate formed at its inner face with elongated channels positioned in confronting relation with said channels in the back plate, said front plate also being formed with passages spaced from communication with said channels therein and communicating with said inlet chamber in the back plate, flexible diaphragm means extending across said channels in the back plate and interposed between the channels in the back plate and the respective channels at the inner face of the front plate, a pilot valve including a valve body formed with passages adapted to effect communication between corresponding ones of the passages and channels in the front plate, adjustable means for controlling the fluid communication through said pilot valve body between the corresponding passages and channels in the front plate for passing fluid at line pressure from said inlet chamber in the back plate to preselected ones of said channels at the inner face of the front plate to seat said diaphragm means against the corresponding channels in the back plate due to fluid pressure unbalance on opposite sides of said diaphragm means away from said inlet passages and for blocking the flow of fluid from said inlet chamber in the back plate to another of said channels at the inner face of the front plate to permit the flow of fluid across the adjacent channel in the back plate, and means for exhausting through the pilot valve the fluid located in said other channel in the front plate to which fluid under pressure from the inlet chamber in the back plate is not supplied.

5. A control valve comprising a valve body having first and second passages therein, a first elongated open channel in said body communicating with said first and second passages, an injector in said body including a fluid discharge passage communicating with said second passage and a pair of fluid inlet passages, a second open channel communicating said first passage and one of said inlet passages of said injector, diaphragm means mounted on said body to overlie said first and second channels, means for applying fluid at line pressure to said first passage to flow across said first and second channels to said second passage, means defining first and second chambers on the opposite side of said diaphragm from said first and second channels respectively, and means for selectively supplying fluid at line pressure to said first and second chambers to seat said diaphragm against one of said channels due to pressure unbalance on opposite sides of the diaphragm and permit fluid flow through the other of said channels.

6. A control valve for a water softening apparatus comprising a valve body having a fluid inlet passage, a fluid outlet passage, said body having a flat face and a first elongated open channel in said face communicating with said inlet and outlet passages, an injector having injector inlet and outlet passages and a reagent inlet passage, means communicating said injector outlet passage with said fluid outlet passage, said body having a second open channel in said face thereof communicating with said fluid inlet passage and said injector inlet passage, diaphragm means mounted on said face of said body to overlie said first and second channels, means defining first and second chambers on the opposite side of said diaphragm from said first and second channels respectively, means for applying fluid at line pressure to said fluid inlet passage to flow through said first and second channels to said fluid outlet passage, and means for selectively supplying fluid at line pressure to said first and second chambers to seat said diaphragm against one of said channels and permit fluid flow through the other of said channels.

7. A valve assembly comprising a back plate having a fluid inlet chamber, a plurality of channels formed at the inner face of said back plate, passages leading to and from said channels in the back plate and including inlet passages communicating between said inlet chamber and said channels in the back plate, a front plate formed with chambers positioned in confronting relation with said channels in the back plate, diaphragm means clamped between the inner faces of said front and back plates and extending across the channels in the back plate, a pilot valve including a valve body mounted on said front plate, a plurality of valve passages extending through said valve body and said front plate and communicating with said inlet chamber in the back plate, spaced valve seats in each of said valve passages, valve means movably mounted in each of said valve passages for movement alternately into position on said first and second valve seats, passage means in said valve body and said front plate communicating each of said chambers in said front plate with one of said valve passages between the valve seats therein, a pilot valve actuator including a cover plate movably mounted on said valve body and overlying said valve passages, means between said cover plate and said valve body providing communication between each of said valve passages, a drain passage in said valve body communicating with said last-mentioned means, each of said valve means being pressure actuated in response to fluid pressure in said fluid inlet chamber in said back plate into position on said second valve seat whereby fluid pressure is applied to the corresponding chamber in the front plate, and cam means on said pilot valve actuator for selectively moving each of said valve means into position on the first valve seat whereby the corresponding chamber in the front plate is connected to drain.

8. A valve comprising an elongated channel having a transversely concave bottom and an open top, inlet and outlet passages communicating with apposite ends of the channel, a flexible diaphragm extending across the open top of the channel, means defining a chamber at the opposite side of the diaphragm from the channel, means for supplying fluid at line pressure to said inlet passage to flow through said channel to the outlet passage, said channel having a length greater than the major transverse dimension thereof to provide an incremental pressure drop along the length of the channel as the fluid flows therethrough, and means for supplying fluid at line pressure to the chamber at the opposite side of the diaphragm from the channel to seat the diaphragm against the bottom of the channel due to the pressure unbalance on opposite sides of the diaphragm away from the inlet passage.

9. In a valve, the combination of an elongated channel having a transversely concave bottom and an open top, inlet and outlet passages at opposite ends of the channel and spaced relatively far apart from one another by the channel, a flexible diaphragm extending across the open top of the channel in spaced relation to the bottom thereof when the pressures on opposite sides of the diaphragm are equal to define therewith a normally open flow passage, means for supplying fluid to said inlet passage to flow through the channel to the outlet passage, said channel having a length greater than the major transverse dimension thereof to provide an incremental pressure drop along the length of the channel as the fluid flows therethrough, and means for selectively supplying fluid at the opposite side of the diaphragm from the channel and for selectively maintaining fluid pressure thereat along the length of the channel at least equal to the fluid pressure at said inlet passage to seat the diaphragm against the bottom of the channel due to the fluid pressure unbalance on opposite sides of the diaphragm away from said inlet passage and toward said outlet passage at the channel.

10. In a valve, the combination of a back plate formed at its inner face with an elongated channel having a transversely concave bottom and an open top, inlet and outlet passages at opposite ends of the channel, a front plate formed at its inner face with an elongated chamber positioned in confronting relation to the channel in the back plate, a flat flexible diaphragm clamped between the inner faces of the front and back plates to seal the interface therebetween and extending across the open top of the channel in spaced relation to the bottom thereof when the pressures on opposite sides of the diaphragm are equal, means for supplying fluid to said inlet passage to flow through said channel to the outlet passage, said channel having a length greater than the major transverse dimension thereof to provide an incremental pressure drop along the channel when fluid flows therethrough, and means for supplying fluid to said chamber in the front plate and for maintaining the fluid pressure along the entire length of said chamber in the front plate at least equal to the fluid pressure at said inlet passage to thereby seat the diaphragm against the bottom of the channel due to the fluid pressure unbalance on opposite sides of the diaphragm away from the inlet passage and toward said outlet passage.

11. A valve assembly comprising, in combination, a back plate formed at its inner face with a plurality of elongated channels, inlet and outlet passages at opposite ends of the channels, a front plate formed at its inner face with elongated chambers positioned in confronting relation with said channels on the back plate, flexible resilient diaphragm means clamped between the inner faces of the front and back plates and extending across said channels in the back plate, means for supplying fluid to certain of said inlet passages to flow lengthwise of the respective channels to said outlet passages, means for supplying fluid to certain of said chambers at the inner face of the front plate and for maintaining the fluid pressure along the entire length of said chambers in the front plate at least equal to the fluid pressure at the inlet passage of the respective adjacent channels in the back plate to seat said diaphragm means against said adjacent channels in the back plate to block the flow of fluid thereacross due to fluid pressure unbalance on opposite sides of said diaphragm means thereat away from the respective inlet passages, a pilot valve selectively controlling the flow of fluid to said chambers in the front plate for selectively controlling the flows through the valve across said channels in the back plate, and means in the pilot valve for exhausting therethrough any fluid located in the front plate chambers to which fluid under pressure is not supplied.

12. Apparatus for controlling the flow of fluid comprising a plate member having an extended flat surface provided with an elongated groove, a second plate member having an extended flat surface provided with an elongated groove similar to the first-mentioned groove, a resilient diaphragm placed between said plate members, means for securing said plate members, separated by said diaphragm, means for introducing fluid in a fluid-tight connection, into one of said grooves, and means for introducing fluid into one end and for removing said fluid from the other end of the other of said grooves.

References Cited in the file of this patent
UNITED STATES PATENTS

| | | |
|---|---|---|
| 1,731,571 | Heare | Oct. 15, 1929 |
| 2,247,363 | Dunn | July 1, 1941 |
| 2,529,505 | Kromhout | Nov. 14, 1950 |
| 2,608,204 | Dunn | Aug. 26, 1952 |
| 2,608,213 | Hruby | Aug. 26, 1952 |
| 2,622,620 | Annin | Dec. 23, 1952 |